United States Patent [19]

Seetaram

[11] Patent Number: 4,688,977

[45] Date of Patent: Aug. 25, 1987

[54] STUD ANCHOR

[76] Inventor: Joan P. Seetaram, 22 Madras Place, Brampton, Ontario, Canada

[21] Appl. No.: 816,825

[22] Filed: Jan. 7, 1986

Related U.S. Application Data

[63] Continuation-in-part of Ser. No. 570,685, Jan. 13, 1984, abandoned.

[51] Int. Cl.$^4$ .................... F16B 13/06; F16B 13/04
[52] U.S. Cl. ........................... 411/45; 411/55; 411/74; 411/61
[58] Field of Search .............. 411/32, 33, 71–74, 411/57, 60, 61, 70, 44, 45, 55, 80, 235

[56] References Cited

U.S. PATENT DOCUMENTS

| | | | |
|---|---|---|---|
| 3,107,569 | 10/1963 | Lerick | 411/32 |
| 3,250,170 | 5/1966 | Siegel | 411/53 |
| 3,766,819 | 10/1973 | Giannuzzi | 411/60 |
| 3,855,896 | 12/1974 | Kaufman | 411/60 |
| 4,100,834 | 7/1978 | Harris | 411/60 |
| 4,195,547 | 4/1980 | Giannuzzi | 411/54 |

FOREIGN PATENT DOCUMENTS

| | | | |
|---|---|---|---|
| 1954077 | 5/1970 | Fed. Rep. of Germany | 411/55 |
| 1750663 | 12/1978 | Fed. Rep. of Germany | 411/80 |
| 2304813 | 10/1976 | France | 411/33 |

Primary Examiner—Gary L. Smith
Assistant Examiner—Neill Wilson
Attorney, Agent, or Firm—Robbins & Laramie

[57] ABSTRACT

An anchor having a shank, a reduced neck portion on the inner end and a tapering portion, and engagement means on the outer end and having a one-piece wedging collar arranged around the reduced neck portion, and having an overlapping portion extending partially up the tapered portion, and such collar having a leading and a trailing end and an axial slot extending part way therethrough from the leading end, near the tapered portion and terminating at a bridge portion, near the trailing end and at least two generally dome-shaped bosses formed in said collar, extending outwardly, and defining a maximum spacing there between greater than the diameter of the shaft shank of such anchor, the bosses being located between the leading end, and the bridge portion, on either side of the axial slot.

4 Claims, 9 Drawing Figures

STUD ANCHOR

This application is a continuation in part of application Ser. No. 06/570,685 entitled Stud Anchor by Joan Seetaram filed Jan. 13, 1984 and now abandoned.

The invention relates to an anchor device for use in materials such as concrete, blocks, and certain types of stone.

BACKGROUND OF THE INVENTION

A well known form of anchor for concrete employs a shank having a tapered expansion portion at its inner end. An axially movable or wedge collar formed of two pieces of metal is arranged around the tapered portion and can be expanded outwardly by applying tension along the axis of the anchor. The collar is then wedged outwardly against the concrete or masonry material by the tapered portion.

One form of such an anchor is shown in Canadian Patent No. 766,493.

One of the problems of that type of anchor was the fact that the collar was formed of two or more separate pieces, which were held in position initially by means of adhesive tape or the like. There was always the possibility for the adhesive tape to become dislodged or damaged, and the collars might simply fall off. When introducing the anchor into a bore hole, in other than ideal conditions, there was also a tendency for the collars to become loosened and lost.

A more serious disadvantage was the fact that the anchor is usually used with some form of threaded attachment means at its outer end. This may take the form of a male thread, or may take the form of a socket, these two being the most popular forms of this type of anchor.

In order therefore to apply the expanding tension along the axis of the anchor, it is necessary for something such as a nut, threaded rod or the like to be attached to the outer end of the anchor. However, in this type of anchor there was no structure to prevent rotation of the entire anchor.

If this occurred, then the threaded fastening device at its outer end could only be tightened up with the greatest difficulty.

An improved form of anchor is shown in Canadian Pat. Nos. 899,699 and 953,958.

In this type of anchor the wedge on the collar is formed of a single piece of metal, and the tapered expansion portion is formed with some form of collar engagement surfaces either in the form of a flattened portion, or a bed or button or groove. The collar also had outwardly extending tongues for engaging the sides of the hole in the concrete.

The collar was thus held by the concrete against rotation. The collar in turn through its engagement with the surfaces on the tapered portion, held the shaft against rotation.

This device was a considerable improvement both in the fact that the collar was made of one piece of metal so that it could not become lost, and also because it was much easier to tighten up when a threaded fastening device was attached to the outer end.

However, it is difficult to manufacture the engagement surfaces and the collar to suitable tolerances in existing mass production techniques, and in practice either the tolerances become so slack that the engagement is not sufficiently secure, or alternatively the costs of production rise to the point where customers will not purchase the anchor.

An additional disadvantage of this anchor in practice was found to be the fact that the tongues on the collar tended to become deformed as the anchor was driven into the hole in the concrete. As a result, they no longer had the same holding capacity, so that in certain circumstances it was still possible for the entire anchor to rotate.

For all of these reasons therefore it is clearly desirable to provide an anchor having a more secure form of engagement between the collar and the side walls of the hole, and also having a more secure form of engagement between the collar and the tapered portion of the shaft, so as to positively resist rotation, and at the same time, being capable of being manufactured by simpler mass production techniques, where critical tolerances do not require to be held to the same degree.

BRIEF SUMMARY OF THE INVENTION

With a view to providing the foregoing features in a simplified form of anchor, the invention comprises an anchor having a shank with an inner end and an outer end, a reduced neck portion formed on the inner end, and a tapering portion extending from the reduced neck, and having engagement means on the outer end, and a one-piece expansion collar arranged around the reduced neck portion on the inner end, and extending partially up the tapered portion, the collar being formed of a single strip of metal having two ends, such collar being formed with said two ends in end abutting relation, and being spaced apart from one another defining an open gap, and such collar having a leading end and a trailing end and in an intermediate portion thereof, an axial slot extending part way therethrough and defining one open end at the leading end directed towards said tapered portion of said anchor, and defining a bridge portion at the end of said slot adjacent the trailing end and there being at least two generally dome-shaped bosses formed in said collar, between the leading and said bridge portion on either side of said axial slot and extending outwardly therefrom, and defining a maximum spacing there between greater than the diamter of the shaft shank of such anchor, said collar making a loose fit around said reduced neck portion, and being squeezable therearound into a tight frictional engagement thereon with a short portion of such collar extending tightly around portion of such tapered portion, upon engagement of said domelike bosses within the surfaces of a bore hole.

More particularly, the invention provides such an anchor wherein the two ends of such collar, and the open-ended slot formed in such collar, define at least four pointed areas overlying part of such tapered portion, such pointed areas being squeezable together upon forcing of said anchor into a bore hole, and said pointed areas being thereby forced into engagement with the tapered portion of said shaft adjacent said reduced neck portion, thereby providing a good frictional engagement between said collar and said shaft, whereby to resist rotation of said anchor.

More particularly, the invention provides an anchor having the foregoing advantages, wherein the open-ended slot in said collar defines a predetermined spacing therein, such that when the collar is squeezed together around the reduced neck and the tapered portion of the shank, the area of the collar adjacent to the open-ended slot is squeezed inwardly while the bridge portion prevents closure of the trailing end.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
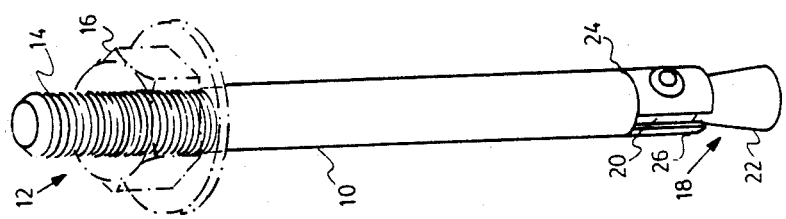
FIG. 1 is a perspective illustration of an anchor according to the invention.

As shown generally in FIG. 1, an anchor according to the invention will be seen to comprise a generally cylindrical shank 10, similar to the shank of a typical bolt. On an outer or trailing end indicated as 12, fastening means 14 are provided such as the male threaded portion. This may carry a typical nut 16, and washer (not shown) such as are well known in the art. However, any other threaded means may comprise the fastening means 14, such as a threaded socket or the like such as is well known in the art.

The inner or leading end of the anchor is indicated generally as 18. It will be seen to consist of a reduced neck portion 20 of cylindrical shape, and a progressively expanding tapered portion 22, which expands out to the diameter of the shank portion 10. A right angular shoulder 24 is formed at the intersection between the reduced neck 20 and the shank 10.

Figure 2:
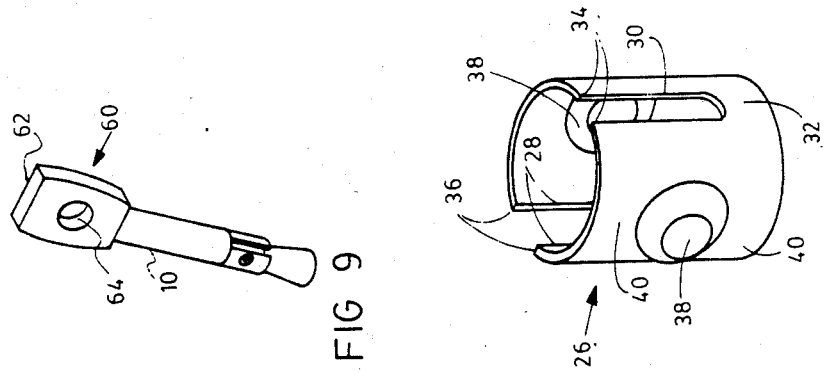
FIG. 2 is a perspective illustration of the collar of FIG. 1 shown in isolation.

Wedge means in the form of the collar indicated as 26 is provided on the reduced neck portion 20. The collar 26 is shown in more detail in FIG. 2.

It will be seen to be a generally cylindrical shape and comprises a single band of metal, typically being heavy gauge highgrade steel, with two edges 28-28 spaced apart. An open-ended axial slot 30 is formed in the collar 26, generally midway between edges 28 which thus places it more or less 180 degrees of arc away from the edges 28. The slot 30 does not extend the full length of the collar 26, and leaves a bridge portion 32 of the collar 26, closing the trailing end of the slot 30.

Slot 30 defines at its leading open end a pair of sharp corners 34. The two edges 28 similarly define a pair of sharp corners 36, at their leading ends.

A pair of generally dome-shaped abutments 38-38 are formed on opposite sides of the collar 26. Two such dome-shaped abutments are shown. It will however be appreciated that in a larger collar, on a large diameter anchor three or more such dome-shaped members could be used if desired. The dome-shaped members are formed merely by pressing impressions or deformations in the metal, and the metal is not in fact cut or severed or weakened at this point. Preferably, the depressions or domes 38 are formed in such a way that they are substantially midway between along the length of the collar 36, so that they leave marginal portions 40 of the collar 38 on either end (see FIG. 7) free of deformation.

The bosses are thus located between the leading end of the collar, and the bridge portion 32 and on either side of axial slot 30.

Collar 26 is of such a width that it extends from the right angular shoulder 24, over the full extent of the reduced neck portion 20 and part way up the tapered portion 22. The transition between the reduced neck 20 and tapered portion 22 is shown as a phantom dotted line in FIGS. 3, 4, and 5.

The circumference of the collar 26 is such that it will not completely encircle the reduced neck portion 20, so that the two edges 28 define a gap between them. In this way the collar 26 makes a loose fit around the neck 20. In fact the collar 26 can be freely rotated around the neck 20, prior to insertion into a bore hole.

Figure 3:
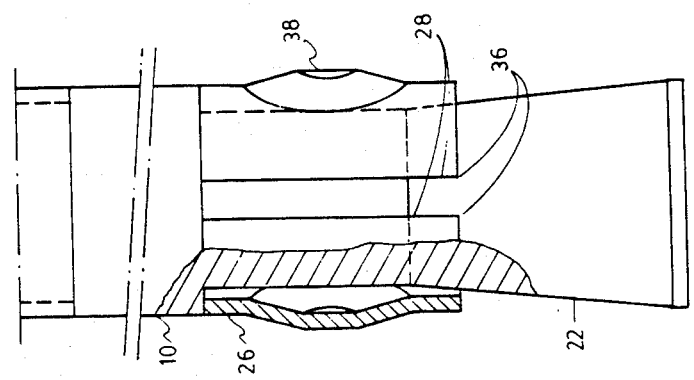
FIG. 3 is an elevational view of a portion of the anchor, FIG. 1.

FIG. 3 illustrates this condition prior to insertion in the bore hole.

Figure 4:
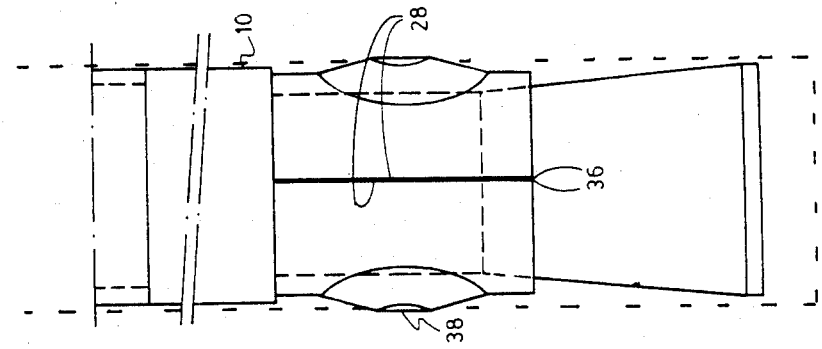
FIG. 4 is an elevational view of the anchor of FIG. 1, showing the same having been inserted into a bore hole, with the collar squeezed inwardly.
Figure 6:
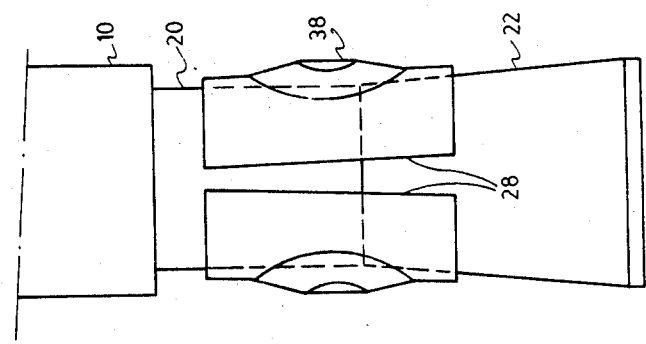
FIG. 6 is an elevational view corresponding to FIG. 4, after expansion of the collar.
Figure 5:
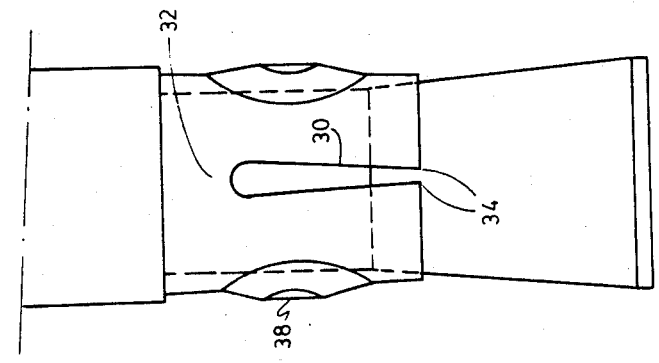
FIG. 5 is an elevational view corresponding to FIG. 4 but showing the reverse side, with the open-sided slot squeezed inwardly deforming the collar.

FIGS. 4, 5, and 6 indicate the operation of the collar after insertion in the bore hole.

In FIG. 4, the collar 26 is shown having been squeezed or compresed within the bore hole. This takes place by the reaction between the domes 38 and the sides of the bore hole, as the anchor is driven manually into the bore hole.

It will be noted that the bore hole makes a snug fit around the shank of the 10 at the anchor, and as shown in FIG. 3 the diametrical spacing between the outer surfaces of the domes 38 is greater than the diameter of the shank 10. Thus the dimensions of the bore hole are such as to apply considerable compressive force to the domes 38 and to actually cause an inward squeezing of collar 26. This inward squeezing will be seen in FIG. 4 to have caused closure of the gap between the edges 28. The edges 28 are not always completely closed. They will usually be squeezed closer together than in the position shown in FIG. 3.

Looking at the reverse side of the collar, in FIG. 5, the squeezing action of the bore hole in this case causes a somewhat different action. Because of the location of the domes on either side of the slot 30, the leading open end of the slot 30 has been squeezed inwardly or closed, whereas the bridging portion 32 of the collar has maintained the trailing end of the slot 30 open.

Thus it will be seen that the leading end of the collar, i.e., the end overlapping the taper 22, has been squeezed tighter than the trailing end, i.e., the end which is still overlying the reduced neck 20.

It will also be observed that by this action, the two sharp points 34 at the open end of the slot 30 and the two sharp points 36 defined by the two free edges 28 of the collar 26, have all been forced tightly into engagement with the tapered portion 22. In fact, these sharp corners and the leading edge of the collar will thus bite into the metal of the taper 22, forming a secure frictional engagement, which is effective to resist substantial rotative forces.

Similarly, the engagement between the domes 38 and the sides of the bore hole is of a resilient nature such that the tighter the fit the better the grip between the collar and the bore hole. Thus the bore hole grips the collar, and the collar in turn tightly grips the shank. The anchor is thus held against rotation.

In order to develop the maximum holding power, tension is then applied to the outer end of the anchor 10. Typically this is done by simply tightening up the nut 16. Alternatively, axial tension can be applied by means of a claw hammer or the like, which by means of leverage can pry the outer end of the anchor outwardly.

This will cause the tapered portion 22 to be forced progressively into the collar 26 which will thus cause expansion. The collar 26 is in turn held in position in the bore hole by means of the engagement between the domes 38 and the sides of the bore hole. Thus the collar 26 is forcibly expanded into tight engagement within the sides of the bore hole, substantially as shown in FIG. 6. Clearly the degree of expansion of the collar 26 will depend upon the compressive strength of the material in which the bore hole is formed which may vary widely from one type of concrete or material to another.

Substantial pullout forces can be developed in this way which are found to be highly effective in practice, and which resist vibration loads, and provide a highly satisfactory form of fastening in the base material.

It is also found that such anchors are particularly convenient for workmen to install since they do not tend to become dismantled or come apart during handling, and are capable of withstanding rough usage and even considerable abuse and will still function as designed.

Figure 7:
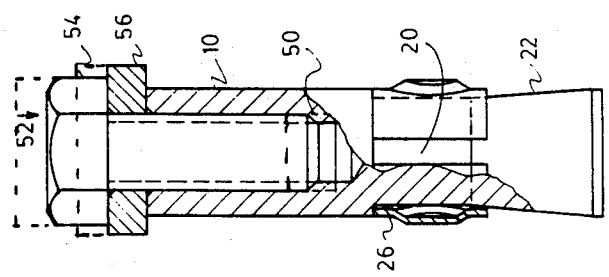
FIG. 7 is a partial section in elevation of an alternative embodiment.

Various modifications are possible. For example, as shown in FIG. 7, the shank 10 can be provided with an internally threaded recess 50, which may receive a threaded rod or bolt or the like (not shown).

In order to assist in firmly setting an anchor of this type, an anchor setting device indicated generally as 52 is provided. This comprises a bolt 54, and a heavy gauge washer or bearing member 56 which is threadedly engaged on the bolt 54.

The setting device 52 provides a convenient means by which the anchor 10 may first of all be inserted into the bore hole, and may then have tension applied to it to partially pull it out thereby developing the maximum pullout forces.

This type of anchor is intended to be set so that the outer end is flush with the surface of the receiving material or concrete. In order to do this, since a certain outward movement takes place during the setting of the anchor, it is necessary that the bore hole shall be drilled somewhat longer than the length of the anchor 10. The anchor 10 is then inserted so that it is in fact inserted with its outer end inwardly of the outer end of the bore hole. This is achieved by simply unthreading the bolt 54 partially from the recess or socket 50 (as shown in phantom). The bolt 54 can then simply be hammered thereby forcing the anchor 10 inwardly in the bore hole.

By means of a wrench, the nut 54 is then simply tightened up, and this applies the axial tension to the anchor 10 which causes the expansion of the collar as shown in FIG. 6. With a very little practice, it is possible for workmen to insert and then tension the anchors 10, so that the outer end of the anchors 10 come substantially flush to the surface of the receiving material.

This is particularly advantageous in construction of large commercial buildings, where it may be desirable to apply exterior finishes to the surface of the concrete after the insertion of the anchors 10.

If desired, the setting devices 52 can be left in position, to prevent the introduction of foreign matter into the recesses 50 during the finishing process. The setting devices 52 can then be removed, and the recesses 50 are then available for threading of any suitable attachment. Typically this will be a threaded rod such as is used for hanging appliances, ducts, water pipes, sprinkler systems and the like.

Figure 8:
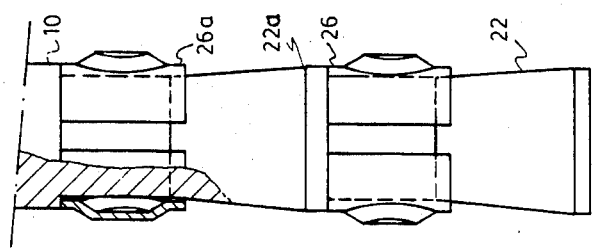
FIG. 8 is a sectional view of a further alternate embodiment.

Another modification is shown in FIG. 8. In certain cases much higher pullout forces are required from a single anchor. In this case the anchor 10 may have a somewhat longer shank, which is provided with two tapered portions 22 and 22A, and two collars 26 and 26A.

In practice, an anchor having a double collar and double taper of this type will be found to develop a higher pullout resistance than an anchor having a single collar although in practice it is not quite equal to double the pullout resistance of a single collar.

Figure 9:
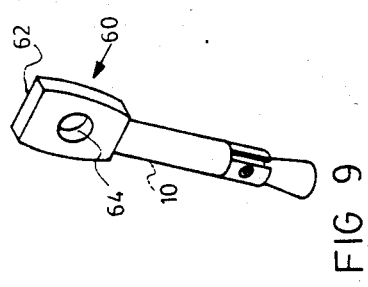
FIG. 9 is a perspective illustration of a further embodiment.

A further embodiment is shown in FIG. 9 wherein an attachment means indicated generally as 60 is provided on the outer end of the shank 10. In this case the attachment means simply comprises a tongue portion 62 having a hole 64. Typically, this type of anchor is used for hanging suspended ceilings, in which the ceiling grid is suspended on wire suspension means.

The foregoing is a description of a preferred embodiment of the invention which is given here by way of examples only. The invention is not to be taken as limited to any of the specific features as described, but comprehends all such variations thereof as come within the scope of the appended claims.

What is claimed is:

1. An anchor comprising:
   a shank with an inner end and an outer end and a central axis;
   a reduced neck portion formed on the inner end having a predetermined length;
   a flared expansion portion extending from the reduced neck;
   engagement means on the outer end of said shank;
   a one-piece wedging collar loosely encircling said reduced neck portion defining an annular gap therebetween, said wedging collar formed of a rectangular panel of sheet metal having parallel side edges and parallel end edges normal to one another, said end edges being bent around to form the collar, said collar having a length greater than said predetermined length of said reduced neck portion and said wedging collar extending partially up said flared portion, said side edges, defining a leading end and a trailing end of said collar, said two end edges being arranged spaced apart from one another defining an open gap having a predetermined regular width along its length, and aligned with the longitudinal axis of said shank;
   a single axial slot formed in said collar equidistant between said two parallel end edges of said rectangular panel, and on an axis parallel thereto extending part way therealong and defining an open leading end at said leading end of said collar, and said panel defining a single integral bridge portion at a rear end of said slot adjacent said trailing end of said collar, said slot having a predetermined length greater than said bridge portion of said panel, and said bridge portion being integral with said panel on both sides of said slot, and said panel defining corners on opposite sides of said open end of said slot, said collar defining a diameter substantially equal to the diameter of said shaft shank, said axial slot being open from said bridge portion to said leading end of said collar and having a predetermined width which is regular from said rear end to said open end;

at least two generally dome-shaped bosses formed in said collar on opposite sides of said axial slot located in a common transverse plane lying between said bridge portion and said leading end of said collar, extending outwardly therefrom, and defining a maximum spacing therebetween greater than the diameter of the shaft shank of said anchor;

said collar making a loose fit around said reduced neck portion and a portion of said expansion portion, and said leading end of said collar being squeezable around into a tight frictional engagement thereon with said portion of said collar clamping tightly around said expansion portion, upon engagement of said dome-shaped bosses within the surface of a bore hole, whereby said axial slot is closed at its open forward end, while said bridge portion holds said axial slot against closing at its blind end thereby driving said corners into said expansion portion whereby said shank is held tightly against rotation, said collar being expandable by said expansion portion upon outward axial movement of said shank, said collar thereby wedging against the surfaces of said bore hole to secure said anchor.

2. An anchor as claimed in claim 1 wherein the two ends of said collar, and said open end of said slot formed in said collar, define at least four pointed corners overlying part of said expansion portion, said pointed corners being squeezable together upon forcing of said anchor into a bore hole, and said pointed corners being thereby forced into said expansion portion of said shaft adjacent said reduced neck portion thereby providing a good frictional engagement between said collar and said shaft, whereby to resist rotation of said anchor.

3. An anchor as claimed in claim 1 wherein said shank has a predetermined uniform outer diameter along its length from its outer end to said reduced neck portion, and wherein said engagement means comprises a female threaded bore in said outer end axially of said shank, for reception of a threaded member therein, and including an anchor tensioning bolt threadedly engaging said female threaded recess, and an oversized washer on said bolt, whereby said anchor may be inserted completely into a bore hole, and thereafter tension may be applied along the axis of said anchor by tightening up said tensioning bolt, whereby to procure expansion of the said collar by said expansion portion, such tensioning bolt being thereafter removed.

4. An anchor is claimed in claim 1 including a second said reduced neck portion extending axially from said first expansion portion, and including a second flared expansion portion extending axially from said second reduced neck portion, and including a second wedging collar arranged around said second reduced neck portion.

* * * * *